United States Patent [19]

Fukushima et al.

[11] Patent Number: 4,750,515
[45] Date of Patent: Jun. 14, 1988

[54] LIQUID STORAGE TANK FLOAT VALVE DEVICE

[75] Inventors: Kazuhiro Fukushima, Hiroshima; Norio Oonishi; Takeo Mizuno, both of Nishiwaki, all of Japan

[73] Assignee: H. Ikeuchi & Co., Ltd., Osaka, Japan

[21] Appl. No.: 62,831

[22] Filed: Jun. 16, 1987

[30] Foreign Application Priority Data

Jun. 19, 1986 [JP] Japan .................... 61-144298

[51] Int. Cl.⁴ .................... F16K 31/18; F16K 33/00
[52] U.S. Cl. .................... 137/448; 251/339
[58] Field of Search ............... 137/434, 443, 448, 429; 251/339

[56] References Cited

U.S. PATENT DOCUMENTS

| | | | |
|---|---|---|---|
| 2,559,046 | 7/1951 | Peters et al. | 137/434 |
| 3,095,896 | 7/1963 | Ross | 137/448 |
| 3,342,207 | 9/1967 | Ross | 137/448 |
| 3,646,955 | 3/1972 | Olde | 251/339 |
| 3,875,267 | 4/1975 | Seki et al. | 137/434 |
| 4,254,794 | 3/1981 | Smith | 137/434 |
| 4,256,136 | 3/1981 | Crawford | 137/448 |
| 4,301,829 | 11/1981 | Rowe | 137/448 |
| 4,371,000 | 2/1983 | Shinoda et al. | 137/434 |
| 4,402,343 | 9/1983 | Thompson et al. | 251/339 |
| 4,403,570 | 9/1983 | Freehafer | 251/339 |

FOREIGN PATENT DOCUMENTS

| | | | |
|---|---|---|---|
| 1530714 | 11/1978 | United Kingdom | 251/339 |
| 1536662 | 9/1979 | United Kingdom | 251/339 |

Primary Examiner—George L. Walton
Attorney, Agent, or Firm—Wenderoth, Lind & Ponack

[57] ABSTRACT

A liquid storage tank having a feed port is provided with a float valve for opening and closing the same. The float valve includes a float member and a rod member having one end connected to the float member. The other end of the rod member is fitted into a valve seat, which is formed on the inner periphery of a feed pipe constituting the feed port, and is provided with a valve plug portion for opening and closing the valve seat. When the level of the liquid in the tank is lowered together with the float member, the rod member is tilted so that the valve plug portion is partially separated from the valve seat to open the feed port. When the float member is in a position at which the float member supports the rod member in a horizontal position, the valve plug portion is seated on the valve seat to close the feed port. The pressure of the supply of liquid acts on the valve plug portion to urge the valve seat portion against the valve seat.

5 Claims, 4 Drawing Sheets

LIQUID STORAGE TANK FLOAT VALVE DEVICE

BACKGROUND OF THE INVENTION

1. Field of the Invention

The present invention relates to a liquid storage tank for storing a supply of liquid received under a comparatively high pressure and for dispensing the same in such a way that the liquid is discharged at a small and constant flow rate under atmospheric pressure or a similar pressure condition.

2. Description of the Prior Art

For continuous discharge, including intermittently continuous discharge, of liquid under a required pressure and flow rate from an incoming supply of the same under pressure, a large-type liquid storage tank is generally employed as, for example, in a cistern for a flush toilet, wherein water is stored for periodic discharge in large quantities, or in an elevated water-service tank installed on a building roof or at a like location, wherein water is stored after being pumped up.

In these storage tanks, liquid is normally stored at a constant level through a automatic supply of the same into the tank as required, and for this purpose a float valve is employed such that liquid supply is automatically stopped when a target liquid level is reached. The manner of liquid level control by a float valve will be explained in detail hereinbelow. In the following description, the liquid involved is understood to be water.

In conventional liquid storage tanks, a float valve 4 as shown in FIG. 6 or FIG. 7 is employed, whereby water supply is controlled so that a predetermined quantity of water is constantly stored in a tank body 1. A feed pipe 5' is connected to a sidewall of the tank body 1 at a position higher than the target water level. The feed pipe 5' is fitted with a float valve 4 which serves to open and close the mouth of the feed pipe 5' as a float member 8 moves upward and downward with changes in the water level in the tank. Any float valve 4 must input a sufficient water stopping force for closing the mouth of the feed pipe 5' against a feed water pressure which is normally on the order of 3 kg/cm$^2$–5 kg/cm$^2$. In the case of the float valve of the ball-tap type as shown in FIG. 6, a moment of force resulting from a combination of a large degree of buoyancy provided by the float member 8 and an elongated arm member 9' is utilized to provide a sufficiently magnified force for closing the mouth of the feed pipe against the feed water pressure. In the case of the float valve as shown in FIG. 7, a large float member 8 is employed which is of an internally hollow construction or which is constructed of a material having a much lower density than water, in order to provide sufficient buoyancy to produce a force large enough to counteract the feed water pressure.

Any such conventional liquid storage tank as described above is designed primarily for storing a large quantity of liquid therein. In the above-described prior art, no proposal has been made oriented toward rendering such a tank or float valve component thereof smaller, although in the areas where large-type storage tanks are required, there is no particular need for rendering the tanks smaller. Since the liquid feed stopping mechanism employing a float valve is for stopping liquid feed against the feed liquid pressure involved, a large-size float member and a considerably long arm member are required to provide a sufficient water stopping force that can overcome the pressure, which necessarily results in a large-size construction for the float valve.

However, in the cas of supplying water to a humidifier, for example, it is required that the water supplied under pressure must be first stored in a tank and subsequently released from the tank intermittently, continuously and steadily in predetermined small quantities under atmospheric pressure. If the humidifier itself is not relatively large and if a storage tank for supplying water under such conditions is to be incorporated in the humidifier, a small-size storage tank is required. Needless to say, it is unjustifiable and undesirable to employ a float valve of the conventional type described above in such small-size storage tanks. However, it is also unjustifiable to use a high-performance regulator, valve, or the like for control purposes, because it involves a great deal of complexity with respect to the control mechanism and a high cost of equipment.

SUMMARY OF THE INVENTION

The present invention is intended to effectively overcome the aforesaid drawbacks. Accordingly, it is a primary object of the present invention to provide a liquid storage tank of a small and simple construction and of such a arrangement that a supply of water received under pressure is first stored in the tank continuously and steadily in predetermined small quantities under atmospheric pressure or a similar pressure condition, that is, without any influence of the original feed water pressure.

The liquid storage tank in accordance with the invention has a feed port in a sidewall of a tank body, the feed port being provided with a float valve for opening and closing the same. The feed port is defined by a feed pipe which has a diametrically reduced portion projecting radially inwardly from the inner wall periphery thereof. There is formed a valve seat for the float valve on the upstream side surface of the radially inwardly reduced portion. The float valve includes a float member movable upward and downward with changes in the liquid level in the tank, and an adequately short rod member having one end connected to the float member and the other end passing through the diametrically reduced portion of the feed pipe. The rod member has a valve plug portion formed thereon at said other end thereof and extending radially outwardly of the rod member in a collar-shape pattern, said plug portion seated on the valve seat. Preferably, the density of the float member is slightly lower than that of the liquid supplied. More preferably, the interior of the tank body is under atmospheric pressure.

In the liquid storage tank of the present invention, the feed port is closed and opened as the valve plug portion formed on the rod member is positioned on and off the valve seat formed in the diametrically reduced portion of the feed port. The on and off positioning of the valve plug portion relative to the valve seat depends on the position of the float member.

When the float member is in a position at which the float members supports the rod member in a horizontal position, the valve plug portion is seated on the valve seat to close the feed port. In this case, a force urging the valve plug portion to be seated on the valve seat arises from a feed pressure acting on the rear surface, i.e. upstream side surface, of the valve plug portion to press the same against the valve seat in the downstream direction. Such a force normally acts on the rear surface of the valve plug portion so as to stabilize the condition in which liquid feed is stopped. In this conjunction, it is to be noted that with any prior art float valve, the liquid feed pressure that normally acts on the valve plug portion tends to urge the valve plug portion away from the valve seat.

When the float member is in a position at which the float member causes the rod member to be inclined, the valve plug portion is tilted by being supported at the point of contact between the upper end of the plug portion and the valve seat, the lower end of the plug portion being disengaged from the valve seat. A force urging the valve plug portion to be disengaged from the valve seat arises from a descending force of the float member during its downward movement following a downward change in the liquid level in the tank. Such a descending force results from the difference between the force of gravity acting on the float member and the buoyancy of the float member. Strictly speaking, the feed pressure acting on the rear surface of the valve plug portion also plays a part; in terms of moment of force, the length of a moment arm consisting of the valve plug portion is so short that the resultant is almost negligible as compared with a moment resulting from a combination of the length of a moment arm from the rod member and the descending force of the float member. Therefore, as the liquid level in the tank is lowered, the float member descends to a position at which a gravity-buoyance balance of zero is reached. However, if the float member is too light, the feed pressure acting on the rear surface of the valve plug portion surpasses the weight of the float member, with the resulting likelihood that the float member will not descend if the liquid level is lowered, there being a possibility that the liquid level will be progressively lowered and only the float member will remain afloat in the air. Therefore, it is desirable that the float member should have a density that will give some slight buoyancy relative to the liquid so that the float member can sensitively follow any change in the liquid level. Thus, if a very small amount of liquid is discharged from the tank, the float member will descend following the resulting slight downward change in the liquid level, so that the discharge can be compensated by immediate supply of the corresponding quantity of liquid into the tank. Thus, a volume of liquid that is great enough to ensure a steady rate of discharge can be constantly retained in the tank.

Furthermore, the fact that the density of the float member is almost equal to that of the liquid means that the float member has a comparatively large weight; this assures that the float member can have sufficient weight if its size, i.e. volume, is reduced. The rod member which constitutes a moment arm have a very short length. Even then, it can provide a sufficient force to disengage the valve plug portion from the valve seat. Thus, it is now possible to provide a comparitively very small float valve.

Since the feed port is provided in a sidewall of the tank body, the valve plug portion is inclined by utilizing the upward and downward movement of the float valve so that the tilt movement of the valve plug portion causes the opening and closing of the float valve.

As is apparent from the above-given description, the present invention provides the following advantage. The liquid storage tank in accordance with the invention performs such a function that a supply of liquid fed under pressure is first stored in the tank and then the liquid is continuously or intermittently continuously and steadily discharged at a predetermined small and constant flow rate under atmospheric pressure. Furthermore, the storage tank is small in size and simple in construction.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENT

Preferred embodiments of the present invention will now be described with reference to FIGS. 1 to 5.

Figure 1:
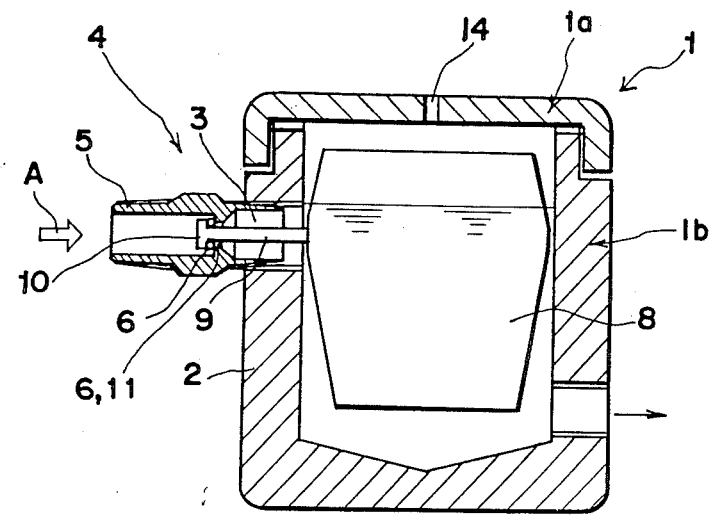
FIGS. 1 and 2 are sectional views showing the schematic arrangement of a liquid storage tank according to a first embodiment of the present invention, FIG. 1 showing the tank as it appears when the float valve is in a closed condition, FIG. 2 showing the tank as it when the float valve is in an opened condition.
Figure 2:
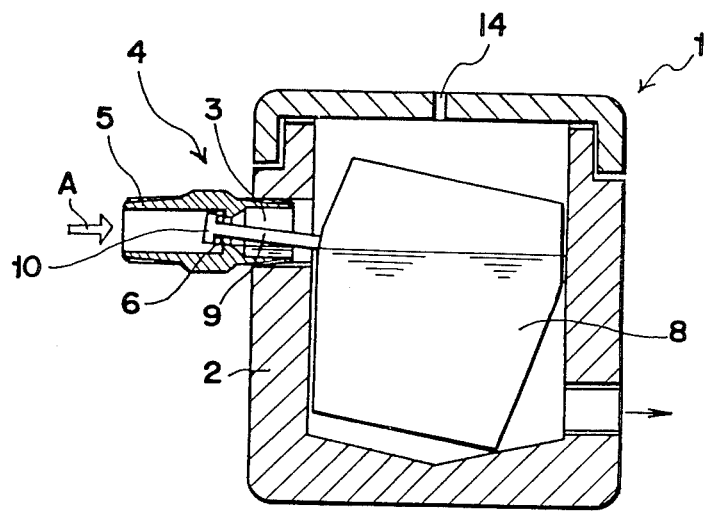

FIGS. 1 and 2 are sectional views showing the arrangement of the storage tank according to a first embodiment of the invention, FIG. 1 showing the tank as it appears when a float valve is in a closed condition, FIG. 2 showing the tank as it appears when the float valve is in opened condition. As shown, the storage tank comprises a body 1b and a lid 1a covering the upper opening of the body 1b. The body 1b includes a sidewall 2 having a feed port 3. The float valve 4 is provided in the feed port 3, said valve 4 having a function of opening and closing the feed port 3.

Figure 4:
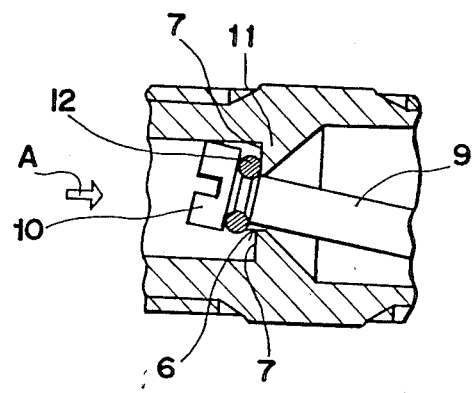
FIGS. 3 and 4 are enlarged, detailed views showing relevant parts of the diametrically reduced portion in FIGS. 1 and 2.
Figure 3:
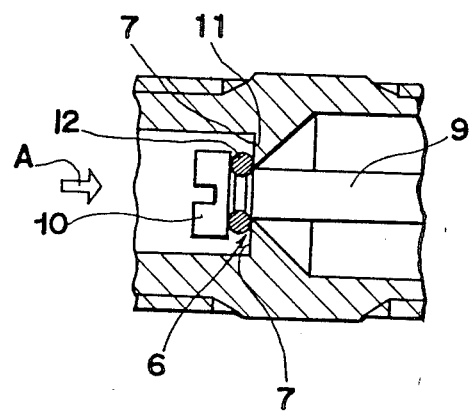

The feed port 3 consists of a feed pipe 5 connected to the side wall 2 of the tank body 1. The feed pipe 5 has a radially inwardly projecting portion 11 formed on its inner wall periphery, said projecting portion 11 defining a diametrically reduced portion 6 for narrowing a path of liquid flow. FIGS. 3 and 4 are, respectively, enlarged detail views showing relevant parts of the diametrically reduced portion 6 seen in FIGS. 1 and 2. A valve seat 7 for the float valve 4 is formed on the upstream side surface of the projecting portion 11 defining the diametrically reduced portion 6.

The valve plug-side components of the float valve 4 include a float member 8, and a rod member 9 fixedly connected at one end to the float member 8 and fitted at the other end in the diametrically reduced portion 6 of the feed port 3. The rod member 9 has a valve plug portion 10 formed thereon at said other end, the plug portion 10 extending radially outwardly of the rod member 9 in a collar-shape pattern so as to seat itself on the valve seat 7 through an O-ring 12. A force acting to seating the valve plug portion 10 on the valve seat 7 results from liquid feed pressure acting on the rear surface 13 of the valve plug portion 10 from the upstream side and in the direction of the arrow A shown. The density of the float member 8 is slightly lower than that of the liquid supplied. Accordingly, the float member 8 has a comparatively large weight. Thus, the float member 8, though quite small in size (volume), still has a justifiably sufficient weight. By virtue of this fact, the rod member 9 serving as a moment arm, though quite short in length, can provide a sufficient moment for disengaging the valve plug portion 10 from the valve seat 7.

In the present embodiment, the float member 8 is tapered over its side periphery at portions above and below the point at which the rod member is connected to the float member 8, so that if the liquid level in the tank is excessively lowered by any reason whatsoever, the side periphery abuts the inner wall surface of the tank body 1 through surface contact or line contact to prevent the rod member 9 or the valve plug portion 10 from being inclined anymore than necessary, thereby preventing the weight of the float member 8 under insufficient buoyancy from acting on the surface of contact (point contact) between the valve plug portion 10 or the O-ring 12 and the valve seat 7, or the surface of contact (point contact) between the rod member 9 and any corner of the projecting portion 11 to prevent the damage of such a portion or surface.

The liquid feed pressure, if water feed pressure from a water service line is used, for example, is normally on the order of 3 kg/cm$^2$–5 kg/cm$^2$. However the tank 1 is provided on the top thereof with a vent port 14 so that the interior of the tank 1 is under atmospheric pressure. Therefore, the liquid from the storage tank is supplied at the gage pressure of 0 kg/cm$^2$.

In the present embodiment, the volume of the float member 8 is designed large relative to the internal volume of the tank, so that the amount of liquid storage is rather small. This provides the advantage that the liquid level is lowered by a large degree in relation to the predetermined small rate of liquid discharge, whereby a highly sensitive valve opening and closing in response to changes in the liquid level can be assured.

Figure 5:
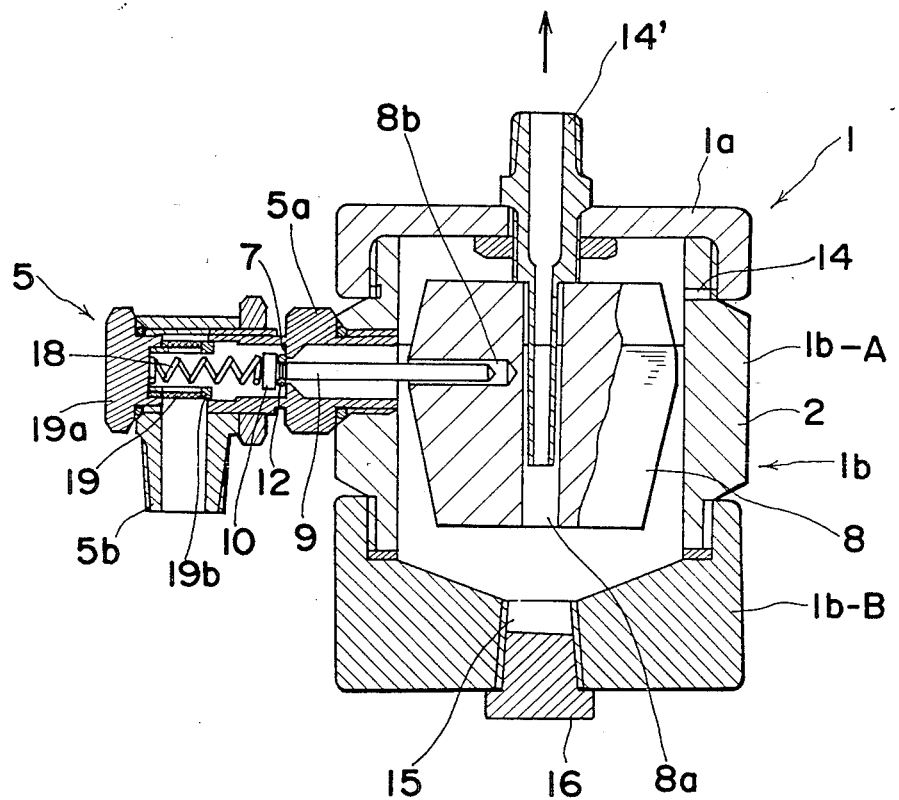
FIG. 5 is a sectional view of a liquid storage tank according to a second embodiment of the present invention, similar to FIG. 1.
Figure 6:
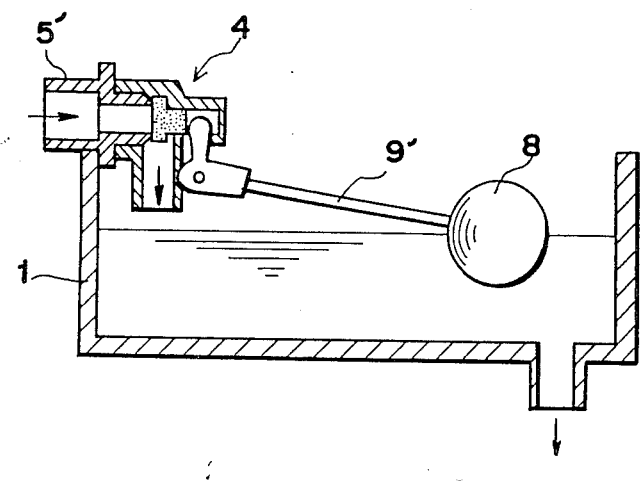
FIGS. 6 and 7 are, respectively, sectional views showing schematic arrangements of the prior art storage tanks, as previously described.
Figure 7:
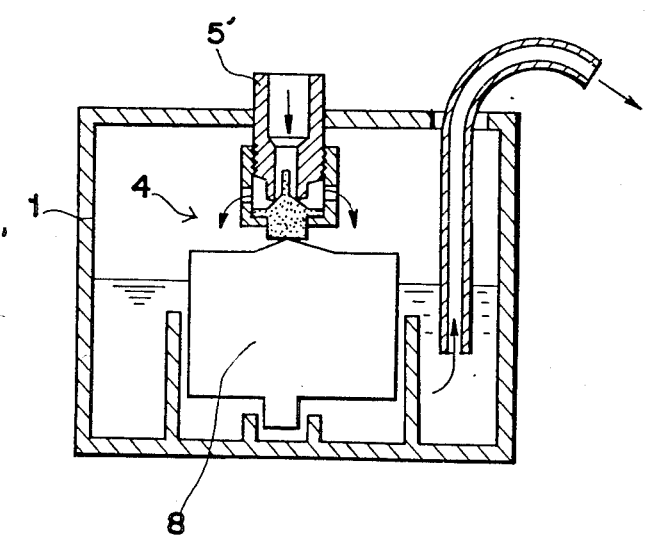

Next, a second embodiment shown in FIG. 5 will be explained. This embodiment represents improvements in the first embodiment.

A liquid storage portion 1b of the tank body 1 comprises two parts, namely, a cylindrical member 1b-A and a bottom member 1b-B screw-connected to the lower edge of the cylindrical member 1b-A. According to this construction, the bottom member 1b-B can be separated from the cylindrical member 1b-A. This permits easy removal of dust and the like foreign matter settled in the bottom member 1b-B. The bottom member 1b-B is formed with a drain hole 16 which is removably stopped by a plug 16.

A vent hole 14 is bored in a sidewall 2 of the cylindrical member 1b-A. This vent hole 14 is located at a position opposite to a lower peripheral edge portion of a lid 1a screw-connected to the upper outer periphery of the cylindrical member 1b-A. According to this arrangement, in the event that the float valve 4 fails to operate by some reason with the result that water supply into the tank cannot be stopped, water is allowed to gradually leak outward through the vent hole 14 and then flow downward along the outer wall of the tank body 1. Even if the water pressure within the tank is abnormally high, water is prevented from jetting out through the vent hole 14 because the lower peripheral edge of the cover member 1a serves to resist such jetting out. Hence, there is no possibility of water jetting out through the vent hole 14.

A discharge port consists of a discharge pipe 14'. The discharge pipe 14' extends centrally through the lid 1a and is fixed thereto. A float member 8 has a longitudinal through-hole 8a centrally bored therein. The discharge pipe 14' extends through the longitudinal through-hole 8a. The inner diametral size of the longitudinal through-hole 8a is considerably larger than the outer diametral size of that portion of the discharge pipe 14' which extends through said through-hole 8a so that the float member 8 is tiltable in response to changes in the liquid level. During assembly of the invention, the positioning of the float member 8 in the tank body 1 can be carried out with the aid of the discharge pipe 14'. The connection of the rod member 9 to the float member 8 need not be a fixed-type connection. In the present invention, any type of connection may be used only if the tilt movement of the float member 8 is sufficiently transmitted to the rod member 9. In the second embodiment, as is apparent from FIG. 5, the float member 8 is formed with a horizontal hole 8b extending inwardly from one side thereof, the free end of the rod member 9 being loosely fitted into the horizontal hole 8b.

In the second embodiment, a feed pipe 5 comprises a first feed pipe 5a and a second feed pipe 5b mounted in a direction perpendicular thereto. The feed pipe 5 in the first embodiment corresponds to the feed pipe 5a in the second embodiment. One characteristic feature of the feed pipe 5 in the second embodiment is that a coil spring 18 is interposed between the first and second feed pipes 5a, 5b. Another characteristic feature is that the second feed pipe 5b is fitted with a strainer.

The strainer 19 is held in position by a holder 19b, and the holder 19b is stopped from slipping off by a strainer cap 19a.

The coil spring 18 is, at one end, in contact with the rear surface of the valve plug portion 10 and, at the other end, with the inner surface of the strainer cap 19a. This coil spring 18 constantly presses the valve plug portion 10 against the valve seat 7, but does not interfere with the tilting movement of the float member 8 with changes in the liquid level. Through the provision of such a coil spring 18 it is possible to assure good sealing of the valve plug portion 10 against the valve seat 7.

What is claimed is:

1. A liquid storage tank comprising:
   a tank body in which a liquid storage chamber is defined;
   a feed pipe connected to said tank body,
   said feed pipe having a feed port extending therein open to said liquid storage chamber at a location disposed on a side of the tank body and through which liquid is fed into said liquid storage chamber in a liquid feed direction, and a valve seat portion projecting radially inwardly into the feed port from the inner periphery of said feed pipe for forming a diametrically reduced portion of said feed port, said valve seat portion having a side surface defining a valve seat that faces in an upstream direction with respect to said liquid feed direction; and
   a float valve for opening and closing said feed port,
   said valve float comprising a float member disposed within said liquid storage chamber and tiltable upwardly and downwardly therein according to the level of liquid in said liquid storage chamber, said float member having a central portion extending in a direction parallel to said liquid feed direction substantially across the entire width of said liquid storage chamber and said float member also having upper and lower portions tapered from respective opposite sides of said central portion for allowing the float member to respectively tilt downwardly and upwardly about an axis extending parallel to said liquid feed direction, said float member having at least one peripheral side for also preventing the float member from tilting more than a predetermined amount relative to said axis by abutting an interior wall portion located above the bottom of the tank body when said float member has tilted said predetermined amount, a short rod member having one end operatively connected to said central portion of the float member and the other end extending through said diametrically reduced portion for restraining the float member to tilting movement with changes in said level of liquid, and a valve plug portion extending radially outwardly from said rod member and movably seated on said valve seat over said diametrically reduced portion of said feed port for opening and closing said feed port to a predetermined degree in response to said tilting movement of the float member.

2. A liquid storage tank as claimed in claim 1, wherein said float member has a density that is slightly lower than that of the liquid fed.

3. A liquid storage tank as claimed in claim 1, wherein said liquid storage chamber is under atmospheric pressure.

4. A liquid storage tank as claimed in claim 1, and further comprising a coil spring extending in said feed pipe and operatively connected to said movable valve plug portion for biasing said valve plug portion to a position at which said valve plug portion is seated on said valve seat to close the feed port.

5. A liquid storage tank as claimed in claim 1, wherein said float member has a hole extending therein, and said one end of said rod member extends in said hole in sliding engagement with said float member.

* * * * *